(12) United States Patent
Adolph

(10) Patent No.: US 6,356,836 B1
(45) Date of Patent: Mar. 12, 2002

(54) METHOD AND DEVICE FOR GENERATING, MERGING AND UPDATING OF DESTINATION TRACKING DATA

(76) Inventor: Michael Adolph, Hohenstrasse 58, D-88142 Wasserburg (DE)

( * ) Notice: Subject to any disclaimer, the term of this patent is extended or adjusted under 35 U.S.C. 154(b) by 0 days.

(21) Appl. No.: 09/445,873
(22) PCT Filed: Jun. 12, 1998
(86) PCT No.: PCT/EP98/03572
§ 371 Date: Apr. 6, 2000
§ 102(e) Date: Apr. 6, 2000
(87) PCT Pub. No.: WO98/57125
PCT Pub. Date: Dec. 17, 1998

(30) Foreign Application Priority Data

Jun. 12, 1997 (DE) .......................................... 197 24 919

(51) Int. Cl.$^7$ ............................................. G01C 21/00
(52) U.S. Cl. ........................ 701/208; 701/206; 701/207; 701/209; 701/211
(58) Field of Search ................................. 701/200, 201, 701/206, 207, 208, 209, 211, 213, 214, 215, 216

(56) References Cited

U.S. PATENT DOCUMENTS

| | | | | |
|---|---|---|---|---|
| 4,107,689 A | * | 8/1978 | Jellinek ........................ 701/217 |
| 4,350,970 A | | 9/1982 | von Tomkewitsch ........ 340/23 |
| 4,668,858 A | | 5/1987 | Heuwieser et al. .......... 235/472 |
| 4,891,761 A | * | 1/1990 | Gray et al. ................... 701/219 |
| 4,897,792 A | * | 1/1990 | Hosoi ........................... 701/208 |
| 4,982,332 A | | 1/1991 | Saito et al. ................... 364/449 |
| 5,214,757 A | | 5/1993 | Mauney et al .............. 395/161 |
| 5,430,653 A | * | 7/1995 | Inoue ........................... 701/210 |
| 5,544,061 A | * | 8/1996 | Morimoto et al. ........... 701/202 |
| 5,699,056 A | | 12/1997 | Yoshida ........................ 340/905 |
| 6,034,626 A | * | 3/2000 | Maekawa et al. ............ 340/995 |
| 6,064,929 A | * | 5/2000 | Migues et al. ................. 701/40 |
| 6,169,955 B1 | * | 1/2001 | Fultz ............................ 701/200 |

FOREIGN PATENT DOCUMENTS

| | | |
|---|---|---|
| DE | 35 12 127 A1 | 10/1986 |
| DE | 38 28 725 A1 | 4/1989 |
| DE | 39 08 702 | 12/1989 |
| DE | 41 05 180 A1 | 8/1991 |
| DE | 40 08 460 A1 | 9/1991 |
| DE | 43 34 886 A1 | 4/1994 |
| DE | 195 34 589 A1 | 5/1996 |
| DE | 195 25 291 | 12/1996 |
| DE | 195 26 148 C2 | 2/1997 |
| EP | 0 090 965 | 10/1983 |
| EP | 0 720 137 | 7/1996 |
| WO | WO 92 02891 | 2/1992 |

* cited by examiner

Primary Examiner—William A. Cuchlinski, Jr.
Assistant Examiner—Marthe Marc-Coleman
(74) Attorney, Agent, or Firm—D. Peter Hochberg; Katherine R. Vieyra; William H. Holt

(57) ABSTRACT

A method and device for generating, merging and updating data for use in a destination tracking system which comprises, among others, the following steps: Generation of data by mobile units (vehicles) to model reality concerning route(s) and traffic, and storing this data for further use. A highly up-to-date and extremely reliable database is built-up in a simple and efficient way by merging data from many units. This database makes it possible to answer a number of complex problems, for example, about the passable route network and realizable travel times. On input of an origin and a destination node together with the intended travel time, destination tracking data is calculated from the stored data. Since the origin-destination relationships of the motions carried out by the mobile units in dependency of all conceivable parameters are known, the destination tracking recommendations for each individual participant can be given such that the sum of the times of movement of all participants is minimized.

53 Claims, 6 Drawing Sheets

METHOD AND DEVICE FOR GENERATING, MERGING AND UPDATING OF DESTINATION TRACKING DATA

BACKGROUND OF THE INVENTION

1. Field of Invention

The invention relates to a method for generating and updating data for use in a destination-tracking system consisting of at least one mobile unit in accordance with claim 1 as well as a device for carrying this out in accordance with claim 38.

2. Description of the Related Art Including Information Disclosed Under 37 CFR 1.97 and 1.98

Navigational or destination tracking systems have recently been attracting significant attention, particularly their application in motor vehicles. The purpose of such systems lies in guiding a driver to a target destination by electronic aids after the destination has been entered by the driver. Firstly, the route can be found accurately without tiresome questioning of third parties and secondly, congestion or other traffic obstructions can be avoided.

Typical navigational systems work by continuously analyzing the current location of a moving vehicle and comparing this position with a road network in the form of geographical data. This information can be read from a road map stored, for example, on a CD-ROM carried in the vehicle. From the geographical data and assumptions about achievable speeds, a computer determines a favorable way to a destination possibly or optionally taking into account additional specific road information such as reports of road works, accident reports, etc., transmitted by communication systems. The result is shown by means of a display, for example represented graphically in the form of a map, in which the location of the vehicle is indicated, e.g., by a point. On the basis of the map displayed together with the current location of the vehicle, the driver can follow the displayed route up to the destination node. Such a system or method is described, for example, in DE 35 12 127 A1.

Similarly, DE 38 28 725 A1 describes a method to record and store a route carried out for the first time with a facility installed in the subject vehicle. When making a new trip along the same route, this recorded information can be reused. This method is intended to simplify the requirements, described in DE 35 12 127 A1, of comparing the current location of the vehicle with stored geographical data for a route which is already known to the subject vehicle. DE 41 05 180 A1 describes an autonomous road guiding system for motor vehicles which contains a device to record the course of a street actually taken and stores the data in a storage unit. Impulses along the route are detected automatically, whereas changes of direction are entered by hand via the push-buttons of the device or via the direction indicator of the vehicle. The storage unit thus programmed can be taken out of the device and given to a third party thus making it possible for the third party to drive along an unknown route with the help of the storage unit. One of the problems of this autonomous road guiding system, among others, is that only quite specific road topologies can be saved and updates are not carried out. Thus neither changes in the road topology nor unexpected events between the programming of the storage unit and the trip of the third party are taken into account. Additional problems are encountered in the "calibration" of the geographical data.

In addition to the above, DE 40 08 460 A1 describes a method which takes into account the current traffic conditions when selecting a route. The current traffic condition data is transmitted to the destination tracking device in the vehicle in the same way which makes it now possible for vehicles with radio sets to receive radio traffic news.

DE 43 34 886 A1 describes a destination tracking device for motor vehicles with an on-board computer which extracts and processes signals for a route to a given trip destination said to be optimal with regard to travel time and/or fuel consumption. The vehicle contains a facility which has collected and stored data on the time-dependent occurrence of traffic obstructions during at least one earlier information gathering trip. Said data are entered into an on-board computer and taken into account when determining a modified route. The well known destination tracking device mentioned above has the advantage that it is not dependent on external facilities such as radio traffic services or computers to record traffic hold-ups. However the data entered to identify traffic obstructions is seldom up to date. The geometric route section data, furthermore, is taken automatically from a CD-ROM and consequently is not always up to date.

U.S. Pat. No. 4,350,970 A1 describes a method for recording the travel time of a vehicle between two given nodes, and for transmitting said travel times to a computer designated as the master computer. Said master computer then compares the travel times with average values; if there are significant deviations, another route is proposed to subsequent vehicles. The transmitting vehicle does not receive the revised result. In other words it is a traffic control system and not a destination tracking system.

DE 195 26 148 C2 and DE 195 34 589 A1 describe methods as well as systems for forecasting traffic flows. The basic structure corresponds to the method and system discussed earlier in DE 35 12 127 A1. But in contrast to the method and system disclosed in DE 35 12 127 A1, the method and system described in DE 195 26 148 C2 successively stores the momentary vehicle speed and its current position which are continuously determined by means of a receiver tracking signals from a navigational satellite system, said receiver being located in a storage unit in each vehicle of a sampling fleet. The stored locations are part of the trip route data which are transmitted time-dependently and/or route-dependently by the sampling vehicle to a traffic control computer. Simultaneously "current trip activity data" from stationary sensors is also transmitted to the central computer. The central computer then analyses the transmitted route and trip activity data against a stored digital road map and determines the traffic volumes, i.e. the vehicles per time unit at a specific road cross section based on that route data. Subsequently, according to DE 195 34 589 A1, traffic development can be forecast by the central computer from the stored traffic volumes. It is reported that the central computer can propose "time-optimal" routes to other road users based on this forecast and its stored digital road maps. The title of DE 195 26 148 C2 not withstanding, traffic flows cannot be forecast by these known methods or systems since the most important information requirement, namely the start and destination nodes of the vehicles, are not known by the central computer. Furthermore, the corresponding linear equation system always exhibits an arbitrary degree of incorrectness.

The systems or methods described in DE 35 12 127 A1, DE 38 28 725 A1 , DE 40 08 460 A1, DE 195 26 148 C2 and DE 195 34 589 A1 have one thing in common, they all use a static database with regard to the geographical data. An exchange of the geographical data is carried out only from time to time. Even a short time after the geographical data of a certain region has been fed into the storage device of a vehicle, it may no longer be up to date since, for instance, a route or link may be blocked, or newly opened, or the travel direction in a one-way street may have changed. Furthermore, these known systems or methods do not take into account the fact that the same route may exhibit different travel times at different times of day, traffic conditions, weather conditions, etc. Another inherent property of these conventional systems is that the destination is addressed by input of the name of the location together with the name of the road and, sometimes, a street number. If the destination node in this format is not known to the system it is impossible to calculate any route.

Furthermore, these known methods and systems are based on the hypothesis that the available road network is essentially known. In fact, however, the geographical data actually stored represents reality only incompletely, with the degree of incompleteness varying from region to region.

The effort necessary to maintain updated information on the accessible route network is both highly time consuming and costly. It is also not feasible to operate in all parts of the world with the same standard. Updating of data is always incomplete and prone to errors and can be carried out only after a significant delay in time. The updated data can be made available to the user only after a significant delay in time.

Since the known methods and systems only have subsets of the actual route network available, the route recommendations might involve considerable detours (with respect to length and time). If for example, an apparently unimportant part of the road network, particularly if it lies in the direct direction to the destination node, is unknown to the system, it may cause a significant delay to the vehicle requesting a route recommendation.

The effect of driving along detours can easily take on considerable significance considering that this fault applies to all mobile units.

BRIEF SUMMARY OF THE INVENTION

It is an object of the invention to establish a method to generate appropriate data utilizable for a practical destination tracking system which carries out a permanent self updating and with data generation which requires little effort. The method is also appropriate for deriving destination tracking data from the data generated in accordance with the aforesaid method.

It is another object of the invention to provide a device for carrying out the method described above.

As far as the method is concerned, the object of the invention is attained by the characteristics of claim 1. Additional advantages resulting from the method of the invention are specified in dependent claims 2 to 37.

The method of the invention is characterized by the fact that in a mobile unit, e.g. a motor vehicle, traveled distance data are generated and are used for automatically generating a digital route network which maps the sections of the route that the mobile unit has covered. This network information is then saved in a storage device. This route network is stored as a section data file which contains the individual route sections with their initial and end points. By means of the continuous extension and/or updating of the section data file with new section data generated for new sections traveled by the mobile unit, the route network corresponds, step by step, to the conditions of the real route network so that, at any point in time, there is a current route section network available to the mobile unit.

In addition to the geographical coordinates $x_i$, $y_i$, of the points $P_i$, the direction of movement $_i$ of the mobile unit can be recorded when generating the traveled distance data. The direction of movement $_i$ can either be derived from the geographical coordinates $x_i$, $y_i$, of the points $P_i$ of the traveled distance data or be detected by means of at least one sensor unit provided for the mobile unit.

To avoid unnecessary overburdening the storage device provided in the mobile unit, additional provisions can be made to permit the generation of traveled distance data and/or section data to be interrupted if the newly generated data already exist in the storage device of the mobile unit, and to cause said generation to be restarted if the newly generated data have not yet been stored in the storage device of the mobile unit.

Since the section data file stored in the mobile unit is continuously extended and/or updated, a highly topical route recommendation can be presented, at any time, if so requested by entering a desired point of destination and possibly a starting point for the mobile unit into an input device contained therein, provided the mobile unit contains a data processing device. If the starting point is already known, it does not need to be entered. The suggested route is presented visually and/or acoustically.

The provision of at least one central computer, separate from the at least one mobile unit, as set out in claim 7, makes it possible to merge the section data files created by several mobile units into at least one overall route file which gives a complete view of the utilizable and used road network. In order to keep the required storage capacity of the central computer to a minimum, provisions can be made so that a central computer checks a section data file transmitted by a mobile unit for its update value before merging the new section data files and only merges those section data files which have been recognized as at least partially new into the overall route file. According to the characteristics of claim 9, it is possible to build up different overall route files for different types of mobile units, for example special files for cars, lorries, motorcycles, cars of various size or type of motor, etc. Other criteria, attached for example to the user of the mobile unit (age, sex, etc.), can also be taken into account for the construction of various types of overall route files. Such type specific files permit the selection of the most favorable route for each category of users.

According to the method of the invention, data collection is fully automatic. Collection of data can of course be switched off from within the mobile unit. If the individual participants are hesitant to have their personal data transmitted to a central computer, then according to claim 10, it may be advantageous to pay for data transmitted by participant to a central computer in order to achieve optimal data collection. The amount of the reimbursement fee can be determined in accordance with the update value of the data.

The communication between the mobile unit and a central computer can be achieved in various ways. The data recorded by the mobile unit can be transmitted to the central computer automatically upon reaching the end of a movement, for example defined as reaching the point of destination, or if requested by the central computer either periodically or in accordance with any other criterion. Given that a mobile unit is fitted with adequate devices, communication between a central computer and a mobile unit can occur alternatively automatically, after a given time period, or upon request by the mobile unit, as a function of the update value of the item of new information to be transmitted, or in accordance with other criteria.

Besides an optional processing device in the mobile unit, a central computer can also propose and transmit to a mobile unit, if so requested by said mobile unit specifying a starting point and a destination point, a proposed route on the basis of the at least one overall route file already stored in the central computer.

Frequently the existing section data file and/or overall route file does not contain the desired origin and/or destination point requested by the mobile unit. In such case, to compute a proposed route, it is recommended that an optional data processing device in the mobile unit or a central computer use the nearest known origin and/or destination point from the section data file stored in the mobile unit or from the at least one available overall route file stored in the central computer.

Known destination tracking systems or methods, in most cases, determine the requested destination node by inputting the town's name, the name of the street, and possibly the street number. However, if the destination node is given by its geographical coordinates, it is possible, as already discussed above, that an optional data processing unit in the mobile unit itself, or a the central computer can direct the mobile unit to a destination in close vicinity of the unknown destination node, by using known coordinates and their corresponding streets and/or street numbers. Any available (geophysical) system of coordinates can be used for this purpose.

Since the input of coordinates is difficult for the average user of such navigational systems or methods, the provision of a bar code reader as an input device to read the coordinates could facilitate the entry of data. A voice input is also possible.

In this connection, it should be noted that the destination point need not be specified by its geographical location alone but also by additional characteristics. Thus the method of the invention can also be used, e.g., to find routes to supermarkets, exhibitions, amusement parks, etc., and, for example, even a specific exhibition stand on the ground of a trade fair could be found. It goes without saying that destination data can also be merged with additional data from other information systems, e.g. informative data about the destination such as hotel data, public transport time tables, speed limits, etc.

A further measure to reduce the requirements of storage capacity in the mobile unit or a central computer is described in claim 20, according to which the generation of traveled distance data of the mobile unit is only activated if the mobile unit does not take the route suggested by a central computer or by the data processing device in the mobile unit itself. Additionally, provision can be made to interrupt the generation of traveled distance data if the trip is interrupted.

Besides the provision explained above for recording geographical coordinates $x_i$, $y_i$, of the points $P_i$ of the traveled distance data, the point in time $T_i$ when points $P_i$ are reached can also be recorded and stored in the storage device of the mobile unit. Furthermore, provision can be made to assign the absolute time of movement $T_{jk}$ to the sections $P_jP_k$ traveled. Also the actual duration of travel $t_{jk}$ can be assigned to the sections $P_jP_k$. By this means, the realized travel time for each individual section can be taken into account in the planning of a route. This procedure is superior to that of known technologies which assign the average speeds reached by a traffic flow on a route section or calculate travel time on the basis of the momentary speed of a sample vehicle, since using speeds to determine a recommended route with a view to the shortest travel time is inadequate both at the microscopic (one mobile unit) and the macroscopic level. Using recorded speeds (the quotient of distance and time) to calculate the required travel time for a route section is fundamentally inaccurate since the speed is constantly changing.

A description follows below on how the additional data mentioned above permit to build up a section data file and/or an overall route file, which takes into account the patterns of movement at various times on the same route sections. For the purpose of data compression and the production of data which are as meaningful as possible, the points of time $T_i$ can be used to merge the section data for those calendar times which exhibit a similar typical movement pattern or traffic activity. This then can be taken into account in the planning of routes.

In addition, it has proven to be advantageous, if the same geographical sections, when covered during different trips of the mobile units in predetermined time periods resulting in the duration of movement $t_{jk}$, are combined in the section data file so that, for instance, the durations of movement $t_{jk}$, are combined in the section data file so that, for instance, the durations of movement $t_{jk}$ required for a given section at a given hour on the first Monday of a given month can be fetched. Average values can be calculated from the durations of movement $t_{jk}$.

The characteristics of claim 28 mean that it is possible to forecast the realizable duration of motion for a typical pattern of movement provided that no special or unusual events, such as accidents, floods, building works, etc., are present.

In determining the pure duration of motion $t_{jk}$, it may be advantageous to suppress the idle time of the mobile unit during the collection of data.

claim 30 gives an example where similar traffic conditions occur during recurrent calendar periods. Generally it can be stated that traffic activity fluctuates periodically so that there are similar calendar times regarding the traffic activity, e.g., Monday morning, Friday afternoon, the start of holiday, etc. The features of claim 31 achieve the advantage that, in addition to the section data collected over a long period of time and evaluated statistically, the most recent section data are stored in a short-term section data file so that it is possible to recognize when a special event, such as a particularly slow travel speed caused by a building works, or an accident, or if the current section is part of a one-way road, etc., is present. The nodes $P_jP_K$ of a route section $P_j$, $P_k$ can be fixed in many different ways. They can, for example, be fixed according to the occurrence of changes of direction or because they lie at the intersection points of sections of different direction.

In order, for example, to be able to obtain further information about petrol/gas stations for mobile units, provision can be made to store additional information, such as the idle time intervals of the mobile units, in the section data. claim 36 characterizes the fundamental execution of the method for the solution of the second part of the purpose of the invention. For example, the section file, which models the total traffic activity, permits to calculate, reliably and with a high level of topicality, a route from a given starting point to a given point of destination, thus minimizing the duration of motion or the length of the route.

The features of claim 37 make additional improvements to the precision of the method in generating destination tracking data. generating destination tracking data.

The computer cited in claims 36 and 37 could either be a data processing device in the mobile unit or a central computer.

Concerning the device and/or the system, the above object of generating data usable for a destination tracking system is attained using the characteristics of claim 38. Claims 39 to 52 describe advantageous embodiments of the device of the invention. The device of the invention has the same advantages which have been previously explained in the description of the method of the invention.

To facilitate inputting address information, an input device can be provided that reads address information from a data storage medium. This data carrier can, for example, be a visiting card containing the address information. Said facility can also be a bar code reading device or a speech input device.

It should be noted that the term "mobile unit" covers not only vehicles but also, for example, pedestrians who are equipped with a portable navigational system in accordance with the invention. Such a system could be advantageous, for example, to a pedestrian, if the names of roads in a city are not available or if the names are written in characters which are not decipherable by the user of the system.

If the mobile unit is a motor driven mobile unit such as a motor car, then the evaluation of the recorded basic data can be improved if the recording unit also includes means for registering the motor revolutions and the fill level of the storage unit for the energy utilized by the engine of the mobile unit, in particular the petrol tank, and for recording the temperature and/or humidity, etc. The accuracy of the evaluation of the data can be further improved by these means since the motor revolutions can be used as an indication of how often the vehicle had to halt at traffic lights and the level of the tank contents can be used to determine where a suitable petrol station is available since the tank's state between empty and full is recorded.

A gyrometer or a compass can be provided to register the direction of movement of the mobile unit. The device for recording the respective absolute position might also be a GPS receiver. In order to reduce the amounts of data required by a central processing unit for the fulfillment of its tasks, it can be advantageous to connect several regional stationary central computers in a network instead of installing a single stationary central computer.

Summarizing, the travel destination tracking data can be calculated from the overall route file after the input of both origin and destination nodes as well as the intended travel time. Since all origin-destination relationships of the traffic or the actual movements of the mobile units in relationship to all possible parameters are known, it is possible to give destination route recommendations for all traffic participants in such a way that the sum of time for the movements of all participants is minimal.

Further advantageous embodiments as well as a demonstration by example are explained below with reference to the following figures:

DETAILED DESCRIPTION OF THE INVENTION

Figure 1:
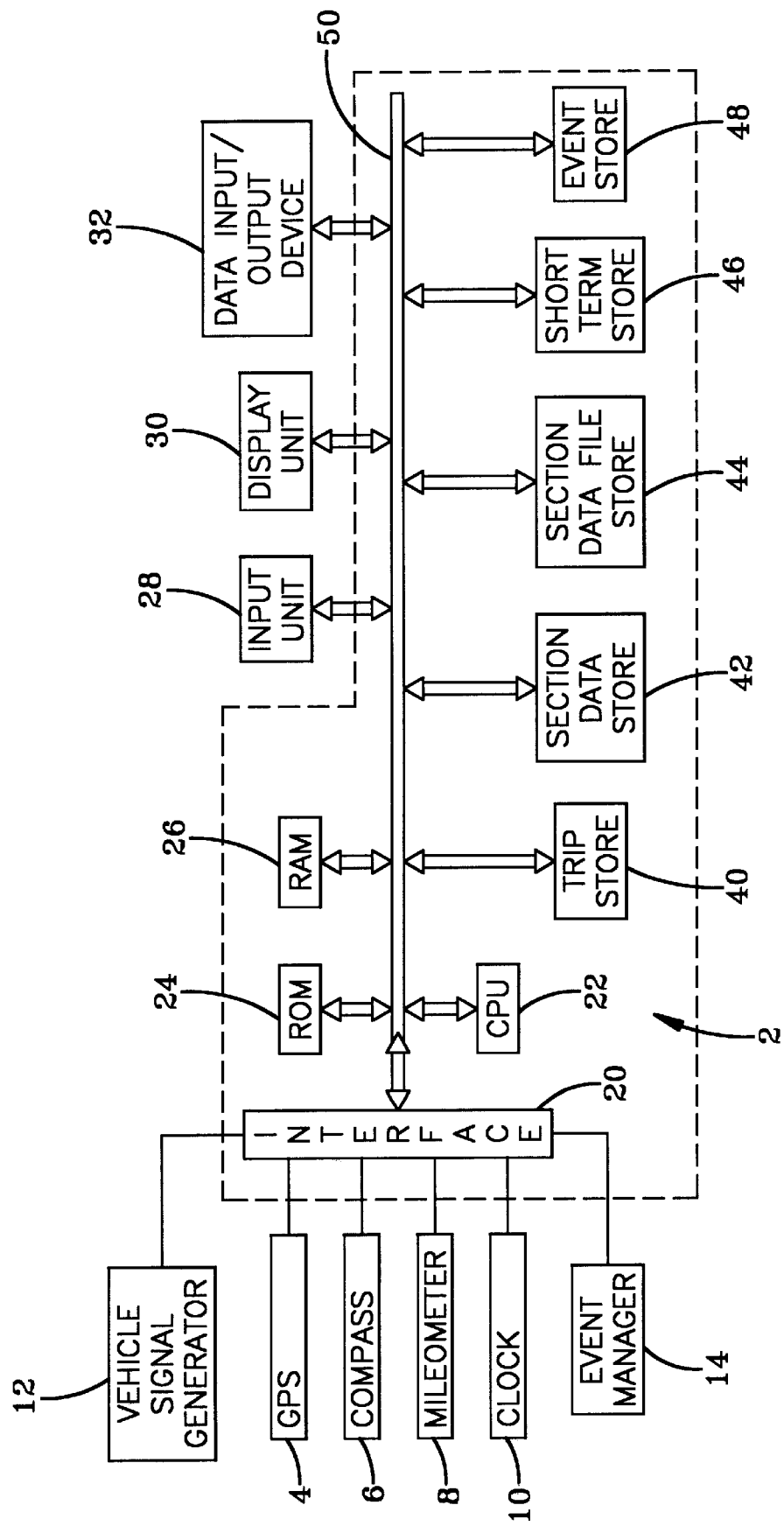
FIG. 1 is a block diagram of an on-board system in accordance with the invention for a vehicle operating as a mobile unit.

FIG. 1 illustrates the destination tracking system in accordance with the invention with its two essential assemblies. The destination tracking system can be installed in a vehicle operating as a mobile unit. In FIG. 1, the inputs of an electronic control device, or electronic unit, designated as a whole with reference number 2 are connected to the sensors, or signaling devices, mentioned below.

A navigational GPS (global positioning system) receiver 4 produces data which give the geographical position of the control device 2 of the mobile unit by, for instance, geographical latitude and longitude. Optionally, the altitude can also be given.

A compass 6 containing, for example, two cross coils reads the geomagnetic field. The compass, which is compensated with regard to any magnetic declination due to the control device 2 or the vehicle, produces a signal which corresponds to the direction of the mobile unit or the vehicle relative to the magnetic north. The compass 6 can be supplemented or replaced by a gyroscope which delivers a more exact value of the direction because of its gyro-stabilization.

A mileometer 8 generates an impulse for each unit of distance covered. This can be done, for example, by reading the revolutions of the vehicle's wheels. Unit 10 is a clock which generates a signal corresponding to the absolute time.

A vehicle signal generator 12 generates a signal specific to each vehicle type. This device is permanently programmed upon installation in the vehicle. An event manager 14 generates a specific signal corresponding to the occurrence of a specific event: i.e. opening and/or closing a door; refueling (opening the petrol tank cap, changing the fuel level); vehicle maintenance (resetting the maintenance interval monitoring device); rain (continuous use of the wipers); frost (low outside temperature); etc. It is understood that additional signaling devices can be made available to record, for instance, fine weather (sunshine), the load under which the engine runs, the weight of the vehicle, the axle loads, etc. In particular, measuring the axle loading is a very simple but most effective method for calculating the stress on the road surface at a road cross section by summing the axle crossings or the normalized axle crossings. The data, when made available to a central computer, can be evaluated to determine the point in time when the road surface requires renewal.

The control device 2 also contains an interface 20 to convert the output signals of devices 4 to 14 into digital signals that are then processed within device 2; a micro processor 22 executing several different computational procedures; a ROM 24, which, among other things, contains the working programs for the micro processor 22; and a RAM 26 with direct access into which the information and current data required to execute the programs are written and from which said information is read out.

An input unit 28 is provided to feed the control device 2 with data. An output or display unit 30 can output information acoustically and/or optically. A data input/output device 32 is provided so that the control device 2 can transmit data to and receive data from a remote central computer. The data input-output device 32 can send or receive data directly or by modem. It can also contain a portable data carrier, by means of which data can be read or written into another location, for example by means of a personal computer (PC). Data can also be inputted and outputted via sensors built into the mobile units and communicating with stationary sensor devices located, for example, in parking lots, petrol stations, etc., said sensors operating either ultrasonically, in the infrared spectrum, or any other non-contact or wireless method.

The data which is derived from signals generated by the devices 4 to 14 are evaluated and stored in a trip storage unit or motion storage unit 40, respectively, a section data storage unit 42, a section data file storage unit 44, a short-term storage unit 46 and an event storage unit 48. The function and the contents of the storage units named above are explained in detail below.

The storage units named above are connected by a data bus 50. The construction of these units is well known and does not need to be further described here.

Figure 2:
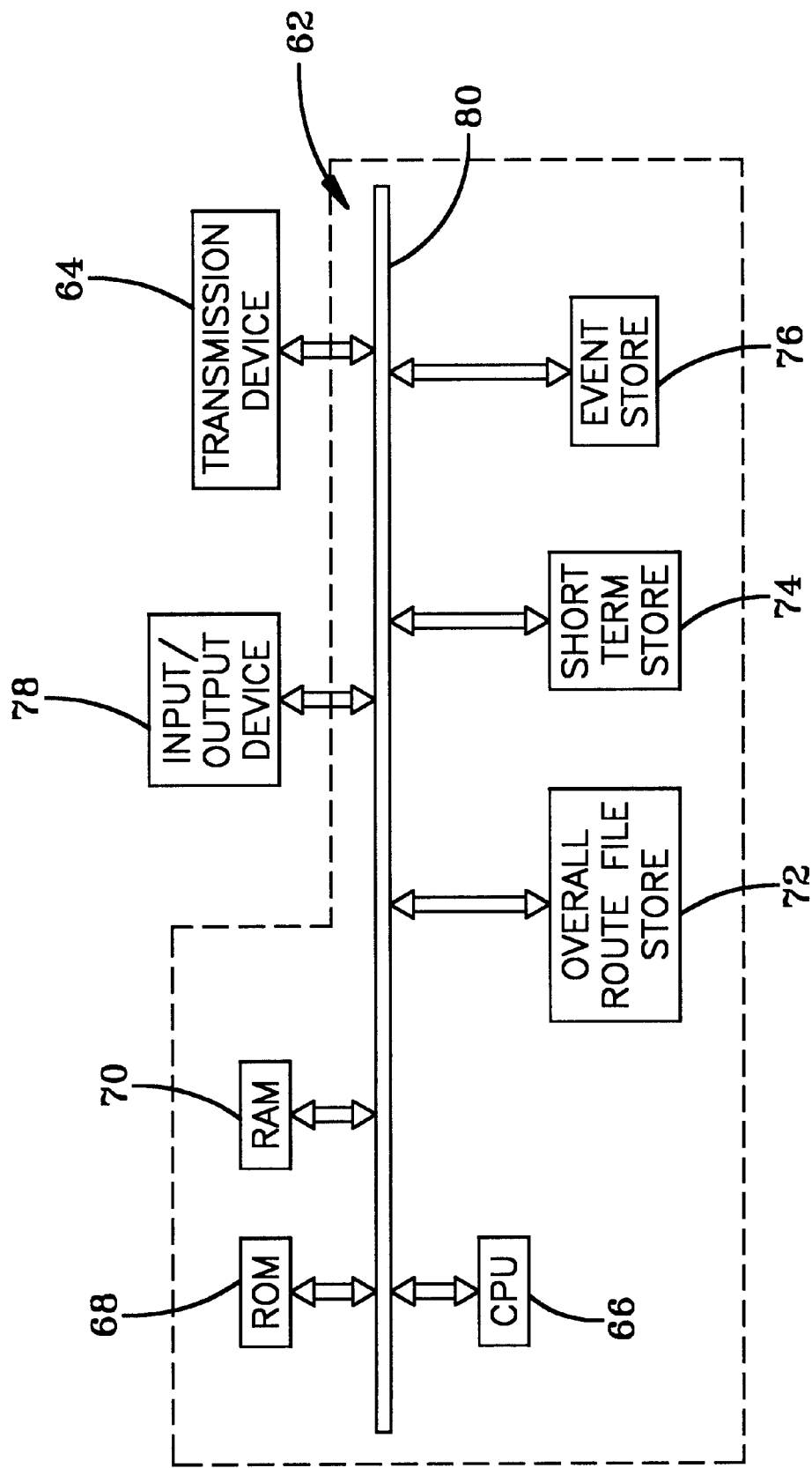
FIG. 2 is a block diagram of a computer which communicates with the system in accordance with FIG. 1.

FIG. 2 shows the circuit diagram of the central computer 62, which has many components which are similar to those of the control device 2 with which it communicates directly or indirectly over a transmission device 64. In the total system, several central computers connected in a network can be assigned different tasks.

The central computer 62 contains a microprocessor 66 with a ROM 68, and a RAM 70, an overall route file storage unit 72, a short-term storage unit 74, and an event storage unit 76. An input/output device 78 transmits data to and from the central computer 62. The construction of all of these constituent units, connected over a data bus 80, is well known.

A typical working sequence of the devices described above is outlined below: When a vehicle representing a mobile unit and equipped with the system corresponding to FIG. 1, activated via input unit 28, is started, the GPS receiver 4 sends a signal which identifies the location of the vehicle, compass 6 sends a direction signal , and clock 10 sends a time signal t. These three signals are combined, in the trip storage unit 40, to a first traveled distance data $P_i$ comprising the geographical coordinates $x_i$, $y_i$ of the starting point $P_i$ and the absolute time $T_i$. The subsequent points $P_{i+1}, \ldots, P_{i+n}$ are stored in the same manner according to a prescribed routine, for example, after a given time interval given by the clock 10 or after a certain distance has been covered as given by the mileometer 8. The location coordinates x and y are compared for plausibility with the subsequent points calculated on the basis of the direction signal and the time signal t, and any deviations are averaged. Thus the route covered is recorded by a series of points. The point records can be supplemented by data generated by the vehicle type signal unit 12, said data way include vehicle model and type, motorization, or similar information mentioned above. If the event generator 14 produces a signal, e.g. a refueling signal, this signal is stored as an event signal E, in the event storage unit 48 together with the location $x_i$, $y_i$ and the time $T_i$. If the vehicle is not moving and this stationary period matches an event such as opening and/or closing a door, refueling, etc., then this is judged to be an interruption of the trip. The points of a first route ending before the event and of the further route traveled subsequent to the event are stored in the trip storage unit 40.

After completion of a trip or even during the trip, section data are generated from the traveled distance or route data stored in the trip storage unit 40, compressing the traveled distance data by dropping individual points $P_i$ and choosing those points $P_j$ and $P_k$ which are most by dropping individual points $P_i$ and choosing those points $P_j$ and $P_k$ which are most characteristic in defining a section of the route. For example, characteristic route nodes $P_j$ and $P_k$ are nodes where the vehicle direction $_i$ changes by more than a given predetermined value, or nodes at the intersection of sections oriented in different directions, or nodes that are otherwise conspicuous. The sections $P_jP_k$ calculated from the route nodes $P_i$ stored in the trip store are saved in the section data storage unit 42 in the following manner:

$P_jP_k = x_j, y_j, x_k, y_k, t_{jk}$, and $T_{jk}$, where x and y represent the geographical coordinates, $t_{jk}$ is the time required to move between the points j and k and $T_{jk}$ is the absolute time of the trip along the section $P_jP_k$. Thus a large number of section data $P_jP_k$ are saved in the section data storage unit 42, said section data being compacted in comparison to the total number of nodes $P_i$ passed on the trip since at least some of the sections include more than two nodes $P_i$.

The numerous trips carried out by a vehicle, whereby the same section is normally traveled several times, are further compressed in the section data file storage unit 44. In the section data file storage unit, the absolute time is divided into a number of fields $A_i$ relating to specific traffic conditions. Each $A_i$ stands for a specific time period, for instance, a particular day in a given month, i.e. it defines a traffic relevant time period. Traffic relevant time periods are, for example, periods when particularly strong rush-hour traffic occurs every Monday morning or, in states which celebrate Christmas from December 24th to 26th, periods when especially heavy long distance holiday traffic occurs each year on December 27th on certain routes. The Thursday before Easter is an example of a holiday not connected to a fixed date which is linked to special traffic conditions. Based on the durations $t_{jk}$ and the absolute times $T_{jk}$, during which certain sections $P_jP_k$ are traveled, a check routine of the microprocessor 22 can independently determine characteristic periodicities or events and define corresponding traffic relevant time periods $A_i$.

The sections $P_jP_k$ with the corresponding durations $t_{jk}$ and the frequency distribution $h(t_{jk})$ are saved in the section data file storage unit. Thus the section data file storage unit contains a section data file which in turn contains the expected time $t_{jk}$ required to traverse a section $P_jP_k$ grouped by traffic relevant time periods $A_i$.

The more section data are assigned to a traffic relevant time period in the section data file storage unit, the more significant is the expected trip time in normal traffic conditions. This precision seems useless if a sudden event changes the traversability of a section $P_jP_k$. In order to take into account such special cases, the section data from the section data storage unit 42 are stored in the short-term storage unit 46 for a short period of time, for example the last 24 hours.

The events $E_i$ reported by the event generator 14 are saved in the event storage unit 48 together with the coordinates $x_i$, $y_i$, and the point in time $T_i$ at which the event occurred. In this way, all trips carried out by the respective vehicle are saved in the control device 2 in the form of sections together with the associated trip time and the traffic relevant points in time. It is self evident that the geometric data of the sections, in so far as they are not new, are not re-recorded on each trip. Thus usually only the duration of the trip and the absolute time and/or the traffic relevant point in time are registered. The user can, of course, switch off the recording and/or transmission of data at any time.

In order to merge the trips of a large number of vehicles and thus achieve an even more significant and extensive coverage of data, the data saved in the storage units 44, 46, and 48 of the specific control device 2 of the vehicle are transmitted, either automatically after a given period, or on request by entry in the unit 28, by the data input/output device 32 to the central computer 62. This data transmission can be either a wireless transmission from the vehicle, by cable using a data carrier taken from the vehicle, or in any other way. Thus it can take place during the trip, or when the vehicle stops, i.e. in a car park, garage, filling station etc. Data transmission can be triggered automatically after a given period, or coverage of a certain distance, depending on the update value of the data, or on request from a central computer, or in some other way. The data from different vehicles is merged in the section data file storage unit 72, the short-term storage unit 74, and the event storage unit 76 and saved, if required, in accordance with the specific vehicle class (vehicle signal generator 12). If, on data transmission to the central computer 62, additional vehicle identification data (vehicle signal generator 12) is delivered, the central computer 62 can evaluate the information content and/or the update value of the transmitted data and transfer a corresponding credit note to the sending vehicle. Alternatively, a toll account can also be carried out by the central computer.

Ensuring that the one (or more) central computer(s) of the system have continuous full coverage of relevant data is achieved as follows: The computer of every vehicle recognizes the update value of the data which it has just determined with regard to the geometric contents (traveled distances) and time contents (trip times). This update value (e.g. the amount of new data) is offered to the central computer together with a geographical specification (e.g. the geographic center). If the central computer requests the data, then a credit note is promised if the data is sent immediately.

A central computer makes a direct inquiry to vehicles currently in areas for which a data requirement exist. A central computer knows the locations of the vehicles because of their past requests for data or data transmission. A central computer can alternatively request vehicles in the area of interest directly by sending the geometric data of the target area. The vehicles then compare the transmitted data with their own location data.

A continuously updated file, more or less condensed, depending on the evaluation procedure, is built up in the central computer 62, and represents the complete traffic activity within the area covered. This information can be evaluated for highly specific tasks by planning authorities, maintenance authorities, etc. Since the data is very comprehensive and up to date it can be used for problems such as green wave traffic signals, one-way traffic, etc. The control of green wave traffic systems require a detailed knowledge of the location of traffic lights, signal time plans, and of the relevant traffic flows. All of this information is contained in merged data received from individual vehicles. Given knowledge of traffic light location and time phases, the individual vehicle can receive a recommendation on speed so that the probability of a stop free journey is maximized.

The entire system requires no infrastructure such as signal coils in the streets, central storage of the road network for example in CD-ROM, collection of traffic statistics, etc., although the use of a CD-ROM as an initial data set is not excluded. The above description deals with the system as far as it is used to generate data via signaling units 4 to 14 contained in individual vehicles (see FIG. 1), which data can be used for a destination tracking system.

The following description explains the use of the system for deriving tracking data from the generated data.

It is assumed that the driver of a vehicle wants to make a trip from a location A to B on a third Monday morning in September, the route leading mostly through rural areas.

The desired trip is entered into the input unit 28 by reading, for instance, a visiting card containing the origin node A and a further visiting card containing the destination node B, both visiting cards containing the geographical information in the form of bar-codes. It is understood that a numeric input or a voice input of the locations of origin and destination are possible alternatives. It is advantageous to enter the origin and/or destination node by means of coordinates since this also permits to enter destinations for which either a postal code or similar address is not available or not known to the system. A further advantage in addressing destinations by coordinates is that the system is able to direct the user to the closest identifiable point, if a desired destination entered is not identifiable.

Since the intended trip is a route which the vehicle does not usually utilize, it is probable that no relevant information is available in the storage units 40 to 48. Thus the input unit 28 will request a central computer for relevant data for the desired trip, e.g. entering the desired trip into the central computer 62 which either calculates a route and sends back the resulting route data set, or just sends all relevant data concerning the areas of origin and destination to the control device 2 which will calculate the route. In both cases the data transmission is charged to the requesting vehicle by the central computer 62. This means that the request is only answered if specific vehicle data or a code identifying either the individual vehicle or the driver has been entered. The full route is put together from the individual section $P_jP_k$ by using a well known optimization algorithm operating on the basis of the data in the section data file 72 or the updated section data file 44 in such a way that, in the case where the trip takes place mostly in rural areas, the distance traveled is minimized. If the trip is mainly through municipal areas or, on express request by the driver, an optimization algorithm which minimizes the total duration of travel time can be chosen. Other possible optimization criteria can be given, i.e. avoidance of road tolls or mountain passes, or minimization of fuel consumption, etc.

The recommended individual route sections are compared with the section data already stored in the short-term storage units 46 or 74. The data of the short-term storage units may suggest that the travel time expected under normal traffic conditions or normal state cannot be realized on a recommended route section. The display unit 30 shows the trip route made up of the individual sections together with the expected duration or arrival time. As the route is traveled the individual sections are identified so that route tips can be given continuously and the location of the vehicle can be shown on a map. Deviations between the route actually driven and the planned route can be corrected by the computer in the vehicle by calculating and displaying an updated route recommendation.

In addition, the event storage unit 48 can be used if, for instance, it is necessary to refuel by requesting the location of a petrol station in the relevant area. Alternatively, referral to an open petrol station can be automatic and navigational help to find the station can be given.

As demonstrated above, the invention creates a system using modern sensor, computer, and storage technology to enable the optimal use of the available highway or route network, respectively, and to achieve predictable travel times, even in high traffic densities, by optimizing the route.

The procedure for updating and merging data corresponding to the invention's method is described below with reference to FIG. 3 to 10.

Figure 3:
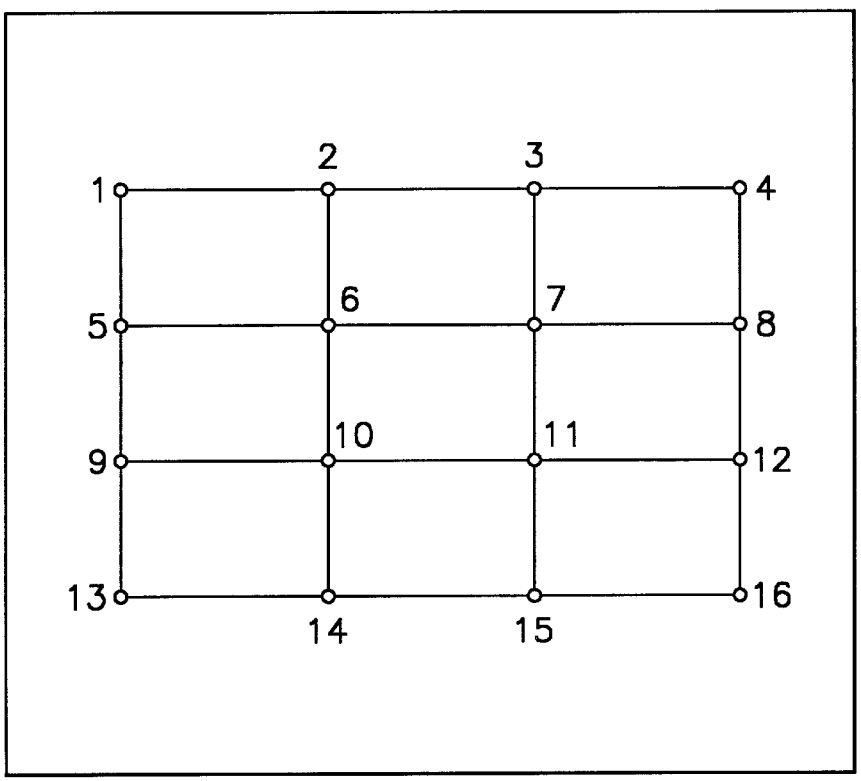
FIG. 3 is a schematic representation of a road network with nodes 1 to 16 representing road intersections with the lines connecting the nodes representing roads.

FIG. 3 shows a known route or road geometry in which the nodes 1 to 16 represent road intersections and the links between these nodes represent roads. This known road geometry can be stored either in the overall route file storage unit 72 of the central computer 62 and/or in the section data file storage units 44 installed in the mobile units or vehicles.

On the basis of this known route geometry or traversable road network, various cases will be described below.

Figure 4:
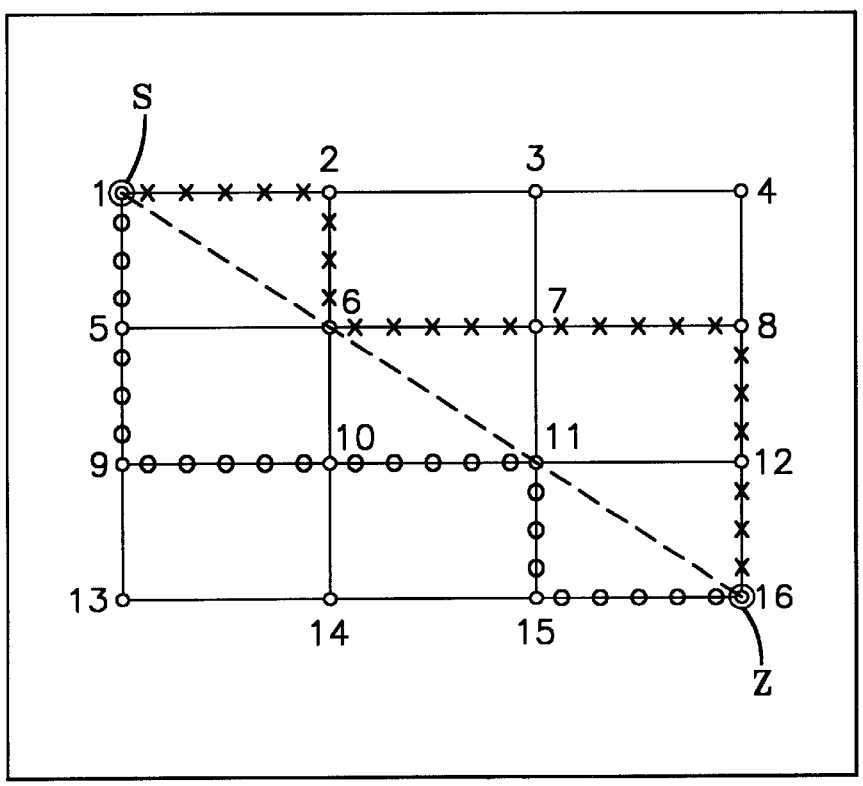
FIG. 4 is a schematic representation of the network of FIG. 3 showing two possible routes between points 1 and 16.

In the first case, referring to FIG. 4 and based on the given route geometry shown in FIG. 3, it is assumed that a first mobile unit, a motor vehicle for example, wishes to drive from the origin S, which lies at node 1, to a destination node Z which lies on node 16 of the given route geometry. Thus both the origin S and the destination Z are known. The central computer 62 or the optional data processing unit or microprocessor of the mobile unit recommend a route calculated on the basis of the existing data material, i.e. the road geometry according to FIG. 3, taking into account travel times from a possible earlier trip of the same mobile unit or that of another mobile unit between the nodes S and Z. The recommended route S→2→6→7→8→12→Z is represented by "x" in FIG. 4.

During the trip microprocessor 22 checks whether the mobile unit is moving along the recommended route. It does so by using sensor 4 to determine the location (i.e. GPS Receiver 4 in FIG. 1) and sensor 6 to determine the direction of motion of the mobile unit (i.e. compass 6 in FIG. 1). Since the route is known it is not recorded again.

On the other hand, however, the travel time, i.e. the time of motion, of the first mobile unit is recorded. The pure travel time, i.e. the time of motion of the mobile unit, and the total travel time, i.e. the difference between departure time of the mobile unit at the origin S and arrival time at the destination Z, can vary due to stops at traffic lights, building works, etc. The distinction between the condition "motion of the mobile unit" and the condition "mobile unit is stationary" can be determined, for example, by means of an appropriate sensor, attached to a wheel or a shaft of the mobile unit, to measure or count rotations. If an additional sensor is provided to measure the fill state of the fuel tank of the mobile unit, the state "mobile unit is stationary while purchasing fuel" can be recorded and used when determining the total travel time. It is also possible to record the location of a petrol station, if this is not yet known, and transmit this information to the central computer 62, along with the rest of the data transmitted by the mobile unit so that this location information can be made available to other mobile units on the same route or in the same area. Upon reaching the destination Z or after a predetermined time period, the transmission device, i.e. the data input/output unit 32 in FIG. 1, transmits the data recorded by the first mobile unit during motion from the intermediate storage units 44, 46 and 48. This can be the pure travel time, the total travel time, the start time of the mobile unit, the weekday, the location of a petrol station, etc. If the first mobile unit is provided with the optional CPU 22, then this data can be processed before being transmitted.

Data is received by the central computer 62 over its transceiver device, i.e. the transceiver unit 64 in FIG. 2, and processed and evaluated by the CPU 66 of a central computer before being saved in the overall route file storage unit 72 in accordance with the route taken between the origin S and the destination Z, the weekday and start time as well as being scored with the pure travel time and/or the total travel time. Insofar as trip times for alternative routes from the origin S to the destination Z in FIG. 4 are not yet known, if another mobile unit wishes to travel along the same route or has the same origin node and destination node, the central computer 62 or the CPU 22 of the mobile unit will, upon transmission of said available data by the central computer 62 to the CPU 22 of said mobile unit, will recommend the route S→2→6→7→8→12→Z, since this route is the only one which has been recorded earlier with a realized trip time.

The case can now be considered where a second mobile unit, or the first mobile unit described above, makes the same trip between the origin node S and the destination node Z in FIG. 4. However, in this case, the mobile unit needs to travel over node 9 (for example because the driver of this mobile unit has to take care of some task on the road section between points 5 and 9 or between points 9 and 10). In such case it is possible to enter this constraint together with the input of the destination. The central computer 62 or the optional CPU 22 of the mobile unit takes into account the constraint and recommends the route S→5→9→10→11→15→Z. This route is marked with "o" in FIG. 4.

The absolute starting time of the trip of the mobile unit is again determined and saved. Once again the pure travel time along each section is recorded together with the total travel time. Since the recommended route is a component of the known road geometry, no recording of road geometry is carried out. Only the location and the direction of motion are checked by the corresponding sensors 4 and 6 to ensure that the mobile unit actually moves along the suggested route. Recorded data is sent by the transmission device 32 to the central computer 62 at the end of the journey or after a predetermined time period. The central computer stores the transmitted data as outlined previously and scores it with the pure travel time and/or total travel time. With regard to the evaluation criterion "shortest travel time", the individual routes are immediately comparable provided that the journey of the second mobile unit has been executed at the same time of day, and on the same weekday, as that of the first mobile unit. Assume that the route S→2→6→7→8→12→Z has a shorter travel time ("pure" travel time or total travel time) than the route S→5→→9→10→11→15→Z, perhaps because the traffic light switching of the second route mentioned is more unfavorable or because the volume of traffic is higher on this route than on the first one. In such case, either the central computer 62 takes into account this result to send the assumed travel time for a recommended route to a mobile unit or it sends the evaluated result to the CPU 22 of the mobile unit, which can then take into account the information independently. Thus a mobile unit making the trip from the origin node S to the destination node Z in FIG. 4 on a specific weekday at a specific time of day, on the basis of this evaluated result, can drive along the route with the minimum time.

It is self evident that on repeating this procedure with a large number of mobile units within the framework of the road geometry, as shown in FIG. 3, favorable routes for other times of day and weekdays can be determined. It should be noted, in this context, that the storage of routes together with the trip times could be done by storing the route as a whole or by storing the individual route segments and their corresponding realized travel times. A substantially higher storage capacity is needed for the last-mentioned method, but a far greater flexibility is reached since a disturbance prolonging the travel time within a route does not require the recalculation of a complete route but possibly only the recalculation of the one segment which needs to be replaced. This case is explained below in detail.

In determining an optimal route with respect to travel time, the situation can arise where a particular route is favorable on a specific weekday at a specific time of day, but unfavorable at another time of day and/or weekday. Furthermore, it is self-evident that the significance and reliability of route recommendations increase with the number of trips made by mobile units in the road network depicted by FIG. 3. Thus, for a time-optimal route between the origin S and the destination Z, highly differentiated route recommendations may be made for different times of the day and days of the week.

Changes to the road geometry can also be taken into account. For example, Suppose that road work is commenced on the route S→2→6→7→8→12→Z between the points 6 and 7 which results in traffic congestion. The method in accordance with the invention takes into account this event by recording an increase in the travel time on the route. Said increase in travel time would be transmitted to the central computer at the end of the trip. After a certain total number of measured travel times, said number of samples being freely selectable as a function of the desired stability of the result, the route would be newly evaluated by the central computer 62. Thus, in recommending a route, the new evaluation would be taken into consideration by the central computer 62 or an optional CPU 22 of a mobile unit, either by calculating a completely new route (e.g. the route S→5→9→10→11→15→Z), or by making a modification to the first route recommendation so that the route would now run: S→2→6→10→11→2→Z.

The destination tracking system or method in accordance with the invention is not only able to determine a minimal time route from several possible routes, depending on the time of day, day of week, etc., for a given road geometry and to update the route recommendations continuously but also to update the road geometry. This capability is explained below.

It is assumed that a third mobile unit also wants to travel from the origin S to the destination Z, with the road geometry of FIG. 3 and FIG. 4 being known. The mobile unit, however, actually takes the route S→6→11→Z, shown in FIG. 4 by the dotted line, due to the knowledge of the user. During this trip, the new road geometry will be recorded by the mobile unit, in particular by means of sensors 4 and 6 which detect the position and the direction of motion of the mobile unit, and this information will then be transmitted to the central computer 62 at the end of the journey or after a predetermined time period. The central computer 62 can now update its data stock with regard to the road geometry and also inform the CPU 22 of the mobile units. In recording this, until now, unknown route, the travel time is also recorded so that this route or its individual segments can be evaluated with regard to the travel time and possibly recommended as a time optimal route.

Figure 5:
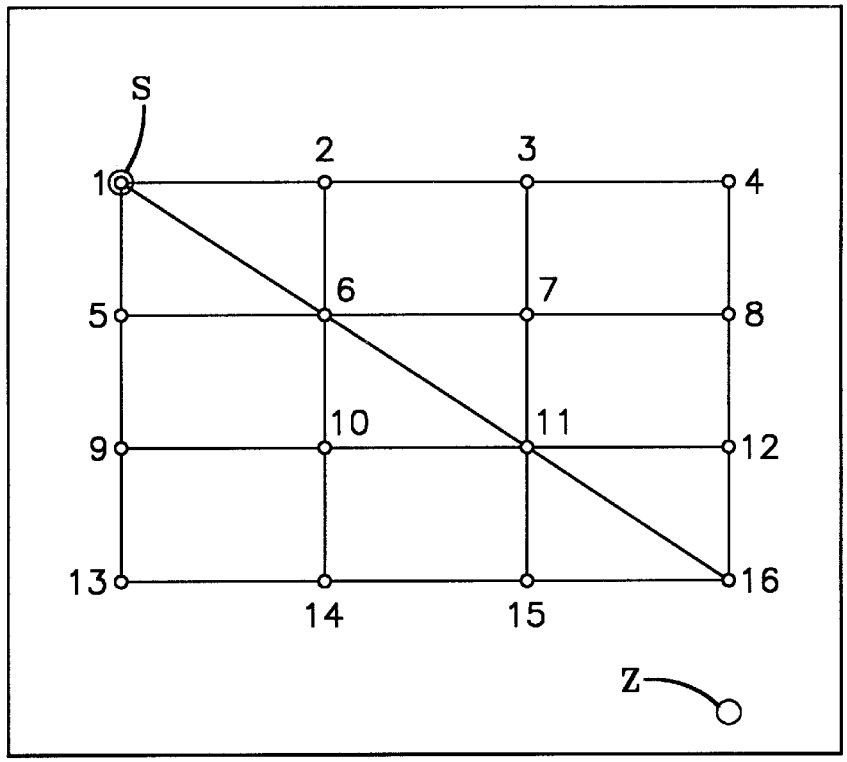
FIG. 5 is a schematic representation of a known road network with a destination point Z outside the network.
Figure 6:
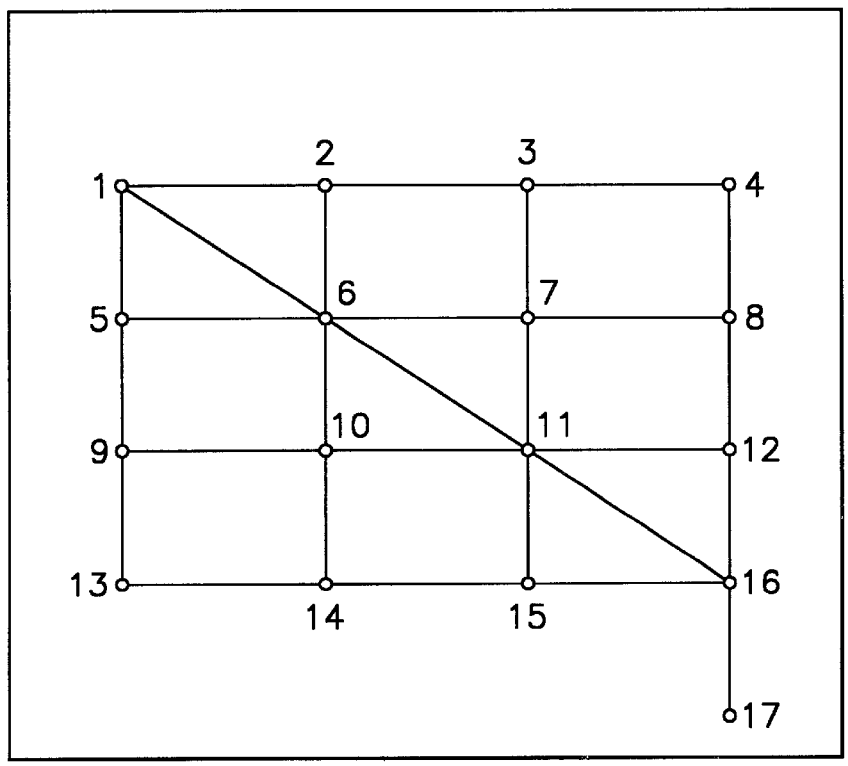
FIG. 6 is a schematic representation of the road network of FIG. 5 after the destination Z has been reached.

A further case corresponding to FIG. 5 is examined below. It is assumed that a mobile unit moves from the origin node S, which corresponds to node 1, to a destination node Z outside the known road geometry and thus unknown to the navigational system. On the basis of the given road geometry, the central computer 62 or the optional CPU 22 of the mobile unit is unable to find a route to a node Z outside the known road geometry. However, upon entry of the coordinates of said destination node Z, the central computer 62 or the optional CPU 22 can identify node 16 as the point nearest to the unknown node Z. Thus a route recommendation is made which brings the mobile unit to a node directly in the neighborhood of the node Z. This route might be S→6→11→16. This is possible as the new route found in connection with the case depicted in FIG. 4 is now known after merging the data representing the corresponding road geometry. The mobile unit must now drive independently from node 16 to the destination Z. This new path from node 16 to destination Z is recorded and at least the new section is sent to the central computer 62 at the end of the trip or after a predetermined period of time. The central computer thus expands its data set. FIG. 6 shows the road geometry known after such trip. The newly introduced node is labeled as 17.

Even though the user of the mobile unit would have to find the link or destination node without the aid of the system according to the invention, the system will, with a high degree of probability, be able to lead the mobile unit back, e.g. to the starting point, due to the recording of the road geometry.

Figure 7:
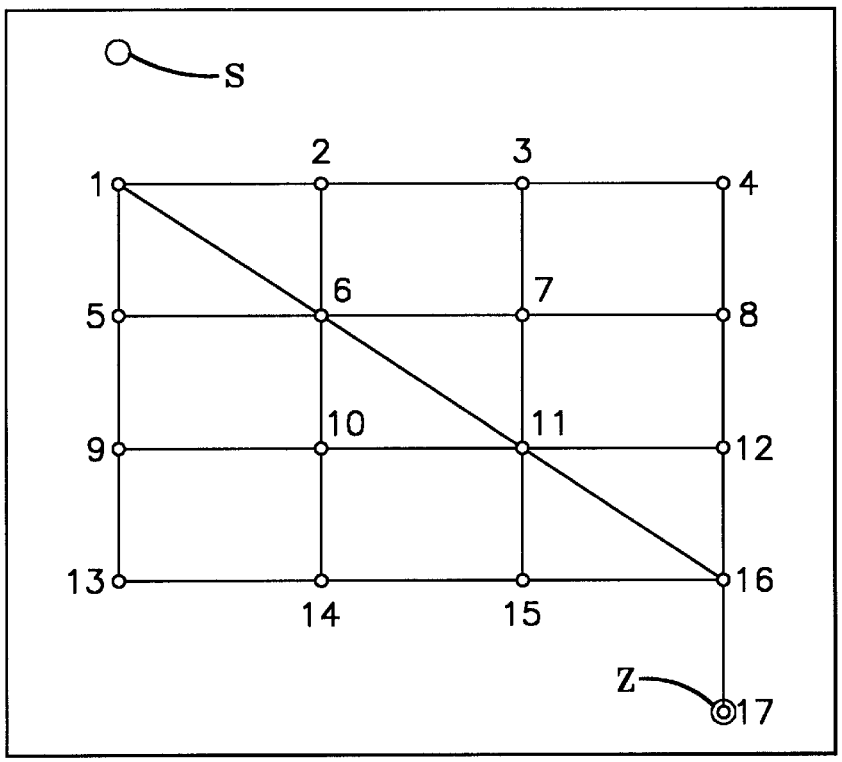
FIG. 7 is a schematic representation of the network of FIG. 6 with the addition of a starting node S outside the known network.
Figure 8:
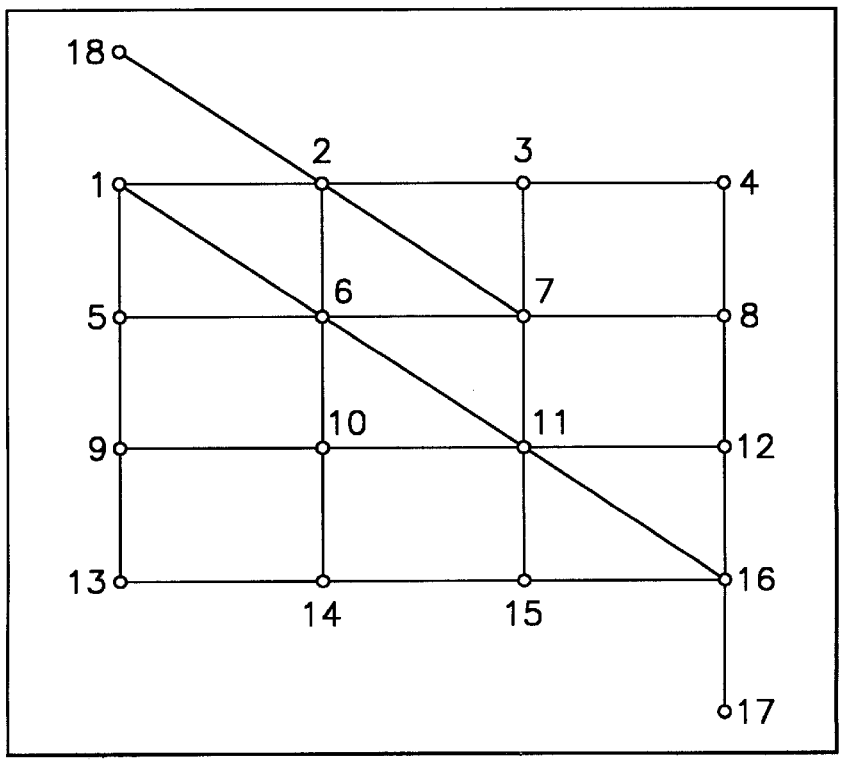
FIG. 8 is a schematic representation of the network of FIG. 7 with the addition of the connection of node 18 to node 2.

FIG. 7 depicts a case analogous to the previous case, but where the destination node Z is known while the origin node S is unknown. The mobile unit commences its trip, at first without a recommended route, until it reaches a node that is known to the central computer 62 or its optional CPU 22. In the present case this is the node 2. It could just as well have been any other node such as 1, 3, 4, 5 or 9, etc. The route from the origin node S to the point 2 is recorded together with the travel time. On reaching node 2, the central computer 62 or the optional CPU 22 of the mobile unit is now able to recommend a route based on the current updated database after merging the data resulting from the examples in FIG. 5 and FIG. 6. This route could be the route 2→3→7→11→16→Z. However, since the driver of the mobile unit knows that a direct geometric connection exists between nodes 2 and 7, he can take advantage of such knowledge when driving to node 7. The mobile unit records this new link in addition to the section already traversed by the mobile unit between the origin node S and node 2. The mobile unit then turns off the recording of road geometry after reaching node 7 since it is traversing known route sections. However, determining and recording of travel times and/or of the absolute times to reach a node are continued. The newly recorded road sections are transmitted to the central computer 62 either at the end of the trip or after a predetermined time period. The central computer evaluates the sections as to the trip times and stores them. The new road intersection is labeled as 18 in FIG. 8, which now reflects the new known road geometry.

This updated road geometry can now be provided to all mobile units either automatically or on demand.

Figure 9:
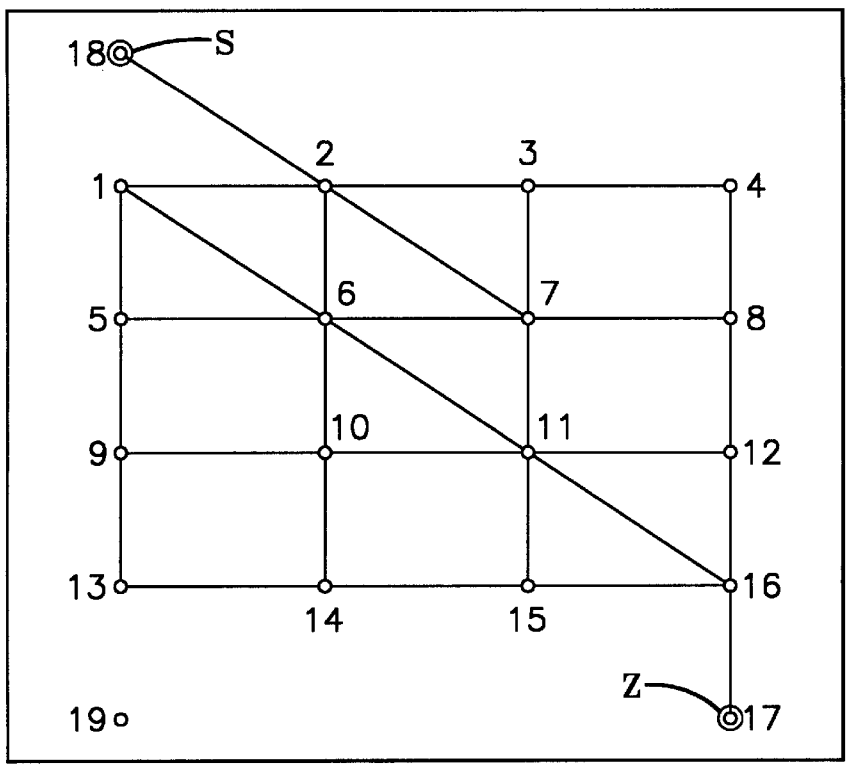
FIG. 9 is a schematic representation of the network of FIG. 8 with the addition of an intermediate node 19 outside the network.
Figure 10:
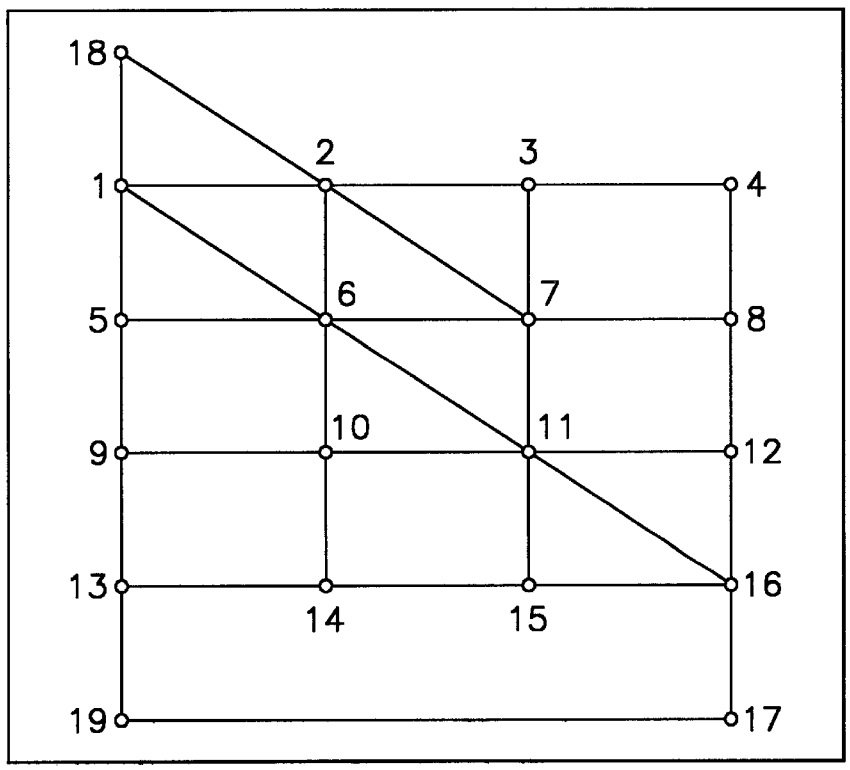
FIG. 10 is the schematic representation of a final network after a mobile unit has traveled a route including nodes 18, 19 and 17.

A final case is shown in FIG. 9. The location of the origin node S and the destination node Z are known. However, on his way to the destination node Z (i.e. node 17), the driver of the mobile unit wishes to visit node 19 which lies outside the known road geometry. Since the connection between the origin node S (node 18) and node 2 is known to the central computer 62 or the optional CPU 22 of the mobile unit from the case described with reference to FIG. 7 and FIG. 8, and, due to the entry of the coordinates of destination node 19, the system components 62 and/or 22 also know that node 13 of the known road geometry is the point closest to node 19, and the recommended route might be S->2->6->10->9->13. The driver must find his own route from node 13 to node 19 and back to node 13 or look for a new route, possibly over node 14, or a direct route to the destination node Z. It is assumed that the driver of the mobile unit is looking for a direct route to the destination node Z and it is also assumed that a direct route between the origin node S (node 18) and node 1 is known to the driver of the mobile unit. The route between the origin node S and node 1, between node 13 and node 19, as well as between nodes 19 and Z is recorded by the mobile unit and transmitted to the central computer 62 as described above. The transmitted data is evaluated as before and made available to the mobile units. FIG. 10 represents the now known road geometry obtained by merging the data.

In contrast to known destination tracking methods or systems, the method or system according to the invention continuously revises data with respect to the traversable network sections as well as realized and realizable trip times or times of motion, to calculate minimal time routes between two arbitrary nodes. This is achieved by merging new data on links and traffic conditions that model reality into the system's storage units. Furthermore, the system or method according to the invention, being based on the use of coordinates, can lead a mobile unit to a node close to the desired location even when this location is not accessible on the basis of the road geometry known to the system.

In conclusion, it is taken for granted that the term "mobile unit" can apply to any type of vehicle as well as to pedestrians who are equipped with a portable appliance which exhibits the same constructional features as those discussed above.

What is claimed is:

1. A method for generating and updating data for use in a destination tracking system of at least one mobile unit comprising:

generating and storing traveled distance data in at least one storage device provided in said mobile unit at least at predetermined time intervals, wherein the traveled distance data represent traveled sections by at least a series of nodes $P_i$ and to each node $P_i$ geographical coordinates $x_i$ and $y_i$ are assigned;

generating and storing section data in the storage device provided in the mobile unit, said section data being generated by selecting, from the traveled distance data, nodes $P_j$ and $P_k$, which define contiguous sections $P_jP_k$, to which at least their geographical starting point and end point are assigned; and generating a section data file from the section data and storing the section data file in the storage device provided in the mobile unit, said section data file being continuously supplemented and/or updated with section data newly generated by the mobile unit.

2. The method according to claim 1, further comprising the steps of measuring and recording as section data a direction of motion $_i$ of the mobile unit, in addition to measuring and recording the geographical coordinates $x_i$, $y_i$ of the nodes $P_i$ of the traveled distance data.

3. The method according to claim 2, further comprising the step of deriving the direction of motion $_i$ from the geographical coordinates $x_i$, $y_i$ of the nodes $P_i$ of the traveled distance data.

4. The method according to claim 2, further comprising the step of detecting the direction of movement $_i$ by means of at least one sensor provided in the mobile unit.

5. The method according to claim 1, further comprising the steps of interrupting the generation of section data in the mobile unit if the section data being generated are already stored in the storage device of the mobile unit and restarting the generation of data if the section data are not yet stored in the storage device of the mobile unit.

6. The method according to claim 1, further comprising the steps of preparing, via a data-processing device provided in the mobile unit, if requested by inputting at least a destination point into an input device provided in the mobile unit, a recommended route from a route data file already available in the storage device of the mobile unit, and representing said recommended route visually and/or acoustically in the mobile unit.

7. The method according to claim 6, further comprising the steps of utilizing, in the event either or both of the starting point and destination point are unknown, the data processing unit provided in the mobile unit or a central computer for processing either or both of the nearest known starting point and/or destination point from the section data file stored in the mobile unit or from the at least one overall route file stored in the central computer to calculate a recommended route.

8. The method according to claim 6, further comprising the step of using coordinates to specify the starting point, the destination point, and/or another point lying between the starting point and the destination point.

9. The method according to claim 8, wherein the coordinates are represented by a bar-code.

10. The method according to claim 6, further comprising the step of restarting the generation of the traveled distance data by the mobile unit when the mobile unit takes a route not recommended by a central computer or by a data-processing device of the mobile unit.

11. The method according to claim 1, further comprising the steps of transmitting the section data files of more than one mobile unit to at least one central computer located in a location remote from said at least one mobile unit and having said central computer merge said section data files at least at predetermined time intervals into at least one overall route file.

12. The method according to claim 11, further comprising the steps of having said central computer check the file transmitted by a mobile unit for its update value before merging said file with the section data files and only merging said file with an overall route file if said file contains at least partially new information.

13. The method according to claim 11, further comprising the steps of adding a characteristic classifying each mobile unit to the files transmitted by said mobile unit, and generating via a central computer different overall route files corresponding to the different characteristics.

14. The method according to claim 11, further comprising the steps of adding an identification code identifying the mobile unit to the data transmitted by the mobile units and detecting, via a central computer, the update value of the data transmitted together with the identification code of the mobile unit for calculating a reimbursement fee for each mobile unit transmitting data.

15. The method according to claim 11, further comprising the step of transmitting the section data file generated by a mobile unit immediately after motion of the mobile unit terminates.

16. The method according to claim 11, further comprising the step of transmitting the section data file generated by a mobile unit to a central computer after a predetermined time interval.

17. The method according to claim 11, further comprising the step of transmitting via a central computer at least one overall route file to the mobile units according to predetermined criteria.

18. The method according to claim 17, further comprising the step of transmitting the overall route file automatically to the mobile units, preferably after a predetermined time interval.

19. The method according to claim 17, further comprising the step of transmitting the overall route file via a central computer to a mobile unit upon a request by the mobile unit.

20. The method according to claim 11, further comprising the steps of preparing and transmitting to a mobile unit, via a central computer, a recommended route calculated on the basis of the at least one overall route file stored in the central computer, if said central computer is so requested by said mobile unit, by transmitting at least a destination point.

21. The method according to claim 1, further comprising the step of terminating generation of the traveled distance data if motion of the mobile unit ceases.

22. The method according to claim 1, further comprising the step of determining absolute coordinates of the mobile unit using the Global Positioning System.

23. The method according to claim 1, further comprising the steps of recording and storing a time $T_i$ of arrival at a node $P_i$ of the traveled distance data in addition to recording and storing geographical coordinates $x_i$, $y_i$ in the storage device of the mobile unit.

24. The method according to claim 1, further comprising the steps of assigning and storing an absolute time of motion $T_{jk}$ to the sections $P_jP_k$ of the traveled distance data.

25. The method according to claim 24, further comprising the step of suppressing duration of non-movement of the mobile unit when determining the duration of motion $t_{jk}$.

26. The method according to claim 24, further comprising the steps of averaging the section data with respect to time of day, day of week, position of the day in the month, and the month and storing computed averages together with the frequency distribution of the durations of motion $t_{jk}$.

27. The method according to claim 24, further comprising the steps of saving, in a short term section data file stored in a short term storage device of said mobile unit, the most recent section data, said short term section data file containing actually realized durations of motions $t_{jk}$ relating to individual section data for a short past period.

28. The method according to claim 1, further comprising the steps of assigning and storing an actual duration of motion $t_{jk}$ to the sections $P_jP_k$ of the traveled distance data.

29. The method according to claim 28, further comprising the step of aggregating geographically identical sections of different motions of the mobile unit for predetermined time intervals of a duration of motion $t_{jk}$ in the section data file.

30. The method according to claim 28, further comprising the step of calculating mean values from the durations of motion $t_{jk}$.

31. The method according to claim 28, further comprising the steps of calculating a frequency distribution of the durations of motions $t_{jk}$ for periods which are identical to typical traffic conditions and assigning said frequency distribution to the section data $P_jP_k$.

32. The method according to claim 1, further comprising the step of determining the nodes $P_jP_k$ of a section $P_jP_k$ in accordance with the occurrence of a change in direction.

33. The method, according to claim 1, further comprising the step of determining nodes $P_jP_k$ of a section $P_jP_k$ so that said nodes lie at the intersection of sections running in different directions.

34. The method according to claim 1, further comprising the step of storing supplementary data, said data comprising at least periods of non movement of the mobile unit, in the section data.

35. The method according to claim 1, further comprising the steps of determining and saving the data within a vehicle representing a mobile unit.

36. A method for deriving destination tracking data from the data generated in accordance with claim 1, comprising:
   requesting a desired trip from a computer with knowledge of a section file;
   specifying said desired trip by inputting a starting point, a destination point, a starting or target time, and any special requirements;
   calculating via said computer a route composed of individual sections using the section file and minimizing the duration of motion or the route length taking into account any special requirements; and
   displaying the relevant data derived from the route determined as described above in a display unit and/or outputting said data acoustically.

37. The method in accordance with claim 36, further comprising the step of using, when the computer calculates a route, the most recent section data stored in the short term section file together with the corresponding section data from the section file which does not deviate typically from the corresponding recent section data.

38. A device for carrying out the method according to claim 1, for use in at least one mobile unit comprising:
   a location sensor to determine the current geographical position of the mobile unit;
   a milometer to generate a route signal corresponding to traveled distance; an input unit;
   a display unit; and
   an electronic control device containing a microprocessor, a ROM and a RAM, said control device comprising:
   a motion storage unit;
   a section storage unit; and
   a section data file storage unit;
   said location sensor, said milometer, said input unit and said electronic control device being electrically connected to carry out said method.

39. The device according to claim 38 further comprising a short term section storage unit.

40. The device according to claim 39, further comprising a direction sensor provided to determine the current geographical direction of the mobile unit.

41. The device according to claim 38, further comprising a clock provided to generate time signals.

42. The device according to claim 38, wherein the input unit comprises a read unit to read an address information as a destination point from a data carrier.

43. The device according to claim 42, wherein said read unit is a facility for reading bar-codes.

44. The device according to claim 38, further comprising a transmission device built into the mobile unit for transmitting collected data and a central computer installed in a remote location from the mobile unit, said computer receiving and evaluating the data transmitted by the transmission device of the mobile unit and thereafter storing the evaluated data.

45. The device according to claim 44, wherein a receiving unit of the transmission device receives data from a central computer and an output device of the mobile unit outputs the data received from a central computer.

46. The device according to claim 44, wherein the transmission device contains an interface.

47. The device according to claim 44, wherein the transmission device contains a radio device.

48. The device according to claim 38, further comprising a recording device for recording the time of starting and ending of a motion and/or the day of the week on which the mobile unit is moved.

49. The device according to claim 38, further comprising a revolution detector for detecting the revolutions of a motor when said device is installed in a motor driven mobile unit.

50. The device according to claim 38, further comprising a fuel level detector for detecting the fuel level of a motor driven vehicle when said device is installed in said vehicle.

51. The device according to claim 38, wherein said direction sensor is a gyrometer and/or a compass.

52. The device according to claim 38, further comprising a Global Positioning System receiver for detecting a current absolute position of the mobile unit.

53. The device according to claim 43, wherein a central computer is part of a stationary navigational unit which in addition to the central computer contains a transmission device to receive and send data from and to a mobile unit and contains at least one storage unit.

* * * * *